United States Patent
Gasbarro

(10) Patent No.: US 6,264,542 B1
(45) Date of Patent: Jul. 24, 2001

(54) APPARATUS FOR SKINNING PIECES OF POULTRY PRODUCT

(76) Inventor: Geno N. Gasbarro, 1401 Lakeshore Dr., Apt. B, Columbus, OH (US) 43219

(*) Notice: Subject to any disclaimer, the term of this patent is extended or adjusted under 35 U.S.C. 154(b) by 0 days.

(21) Appl. No.: 09/416,699

(22) Filed: Oct. 12, 1999

(51) Int. Cl.$^7$ ..................................................... A22B 5/16
(52) U.S. Cl. ........................................ 452/125; 452/127
(58) Field of Search .................................. 452/127, 125

(56) References Cited

U.S. PATENT DOCUMENTS

| | | | |
|---|---|---|---|
| 3,324,915 | * 6/1967 | Townsend | 452/127 |
| 3,613,153 | 10/1971 | McDonald . | |
| 3,714,682 | 2/1973 | Harben . | |
| 3,769,903 | * 11/1973 | Greider | 452/127 |
| 4,292,710 | 10/1981 | Townsend . | |
| 4,359,807 | 11/1982 | Adkinson et al. . | |
| 4,466,344 | * 8/1984 | Schill | 452/127 |
| 4,551,885 | 11/1985 | Molnar . | |
| 5,236,323 | * 8/1993 | Long et al. | 452/127 |
| 5,395,283 | 3/1995 | Gasbarro . | |
| 5,503,593 | * 4/1996 | Schill | 452/127 |
| 5,609,519 | * 3/1997 | Townsend | 452/127 |

FOREIGN PATENT DOCUMENTS 213829 9/1984 (DE) .
4121282 * 1/1993 (DE) .

* cited by examiner

*Primary Examiner*—Willis Little
(74) *Attorney, Agent, or Firm*—Francis T. Kremblas, Jr.

(57) ABSTRACT

An automated poultry skinning apparatus which includes a support frame having a product feed inlet and discharge outlet and housing a conveyor aligned to engage the upper surface of a piece of poultry product entering the feed outlet. The apparatus is provided with a rotatably mounted gripper provided with a plurality of radially extending fins adapted to engage the lower surface of the piece of poultry passing between the gripper and toe conveyor. An arcuate pinch surface is provided which is mounted in closely spaced relationship to the arcuate path traveled by the rotating fins of the gripper and define therewith an opening for trapping the outer skin attached to the poultry product between the arcuate surface and the outer end of a rotating fin to entrap a portion of the skin and pull the skin from the poultry product piece. The conveyor is mounted to the frame to permit automatic adjustment to a range of sizes of poultry product entering the feed inlet while maintaining a controlled downward force against the product engaged by the fins of the gripper.

5 Claims, 12 Drawing Sheets

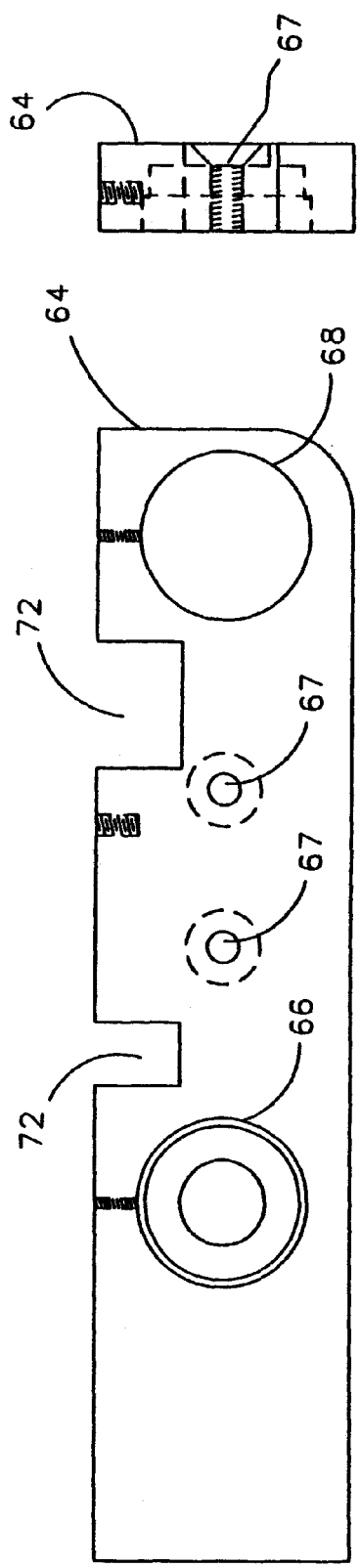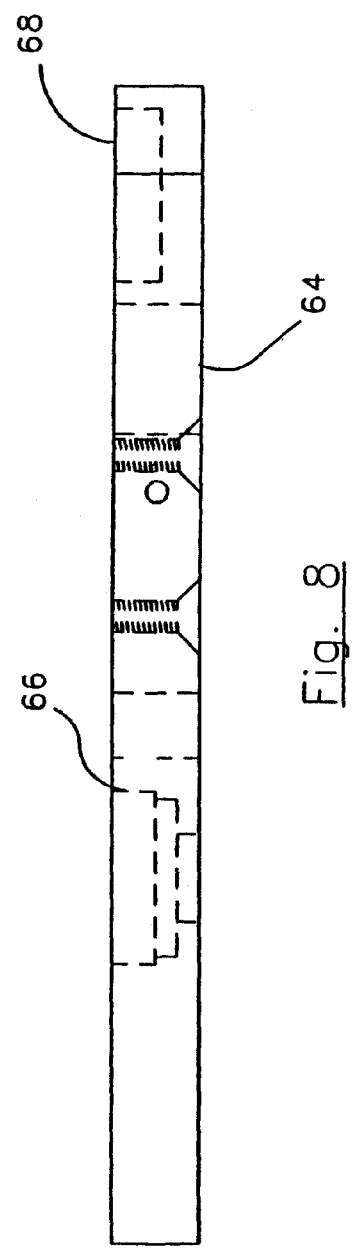

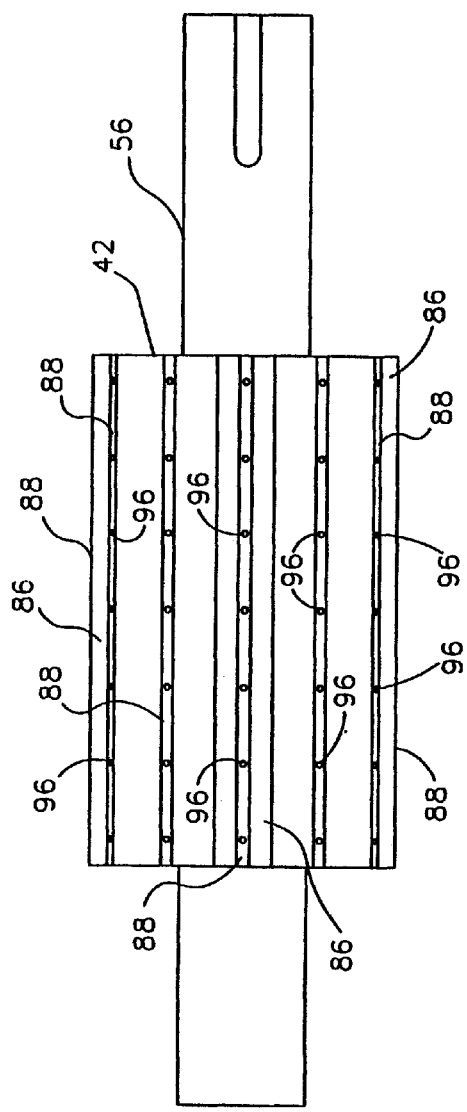
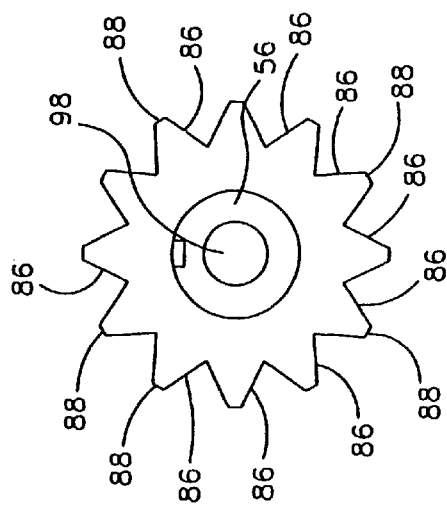

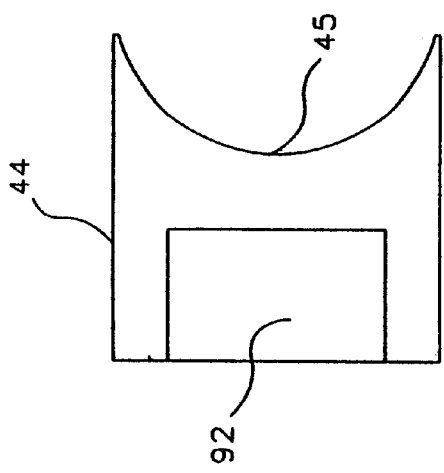
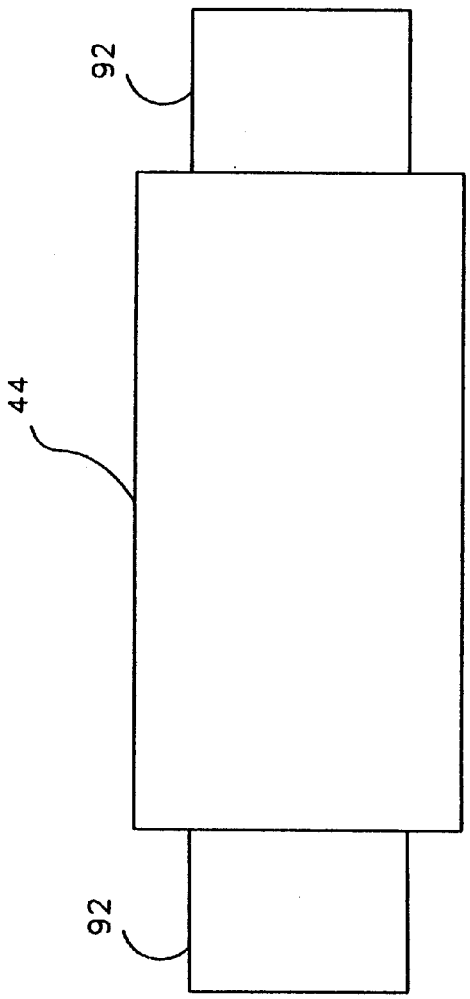
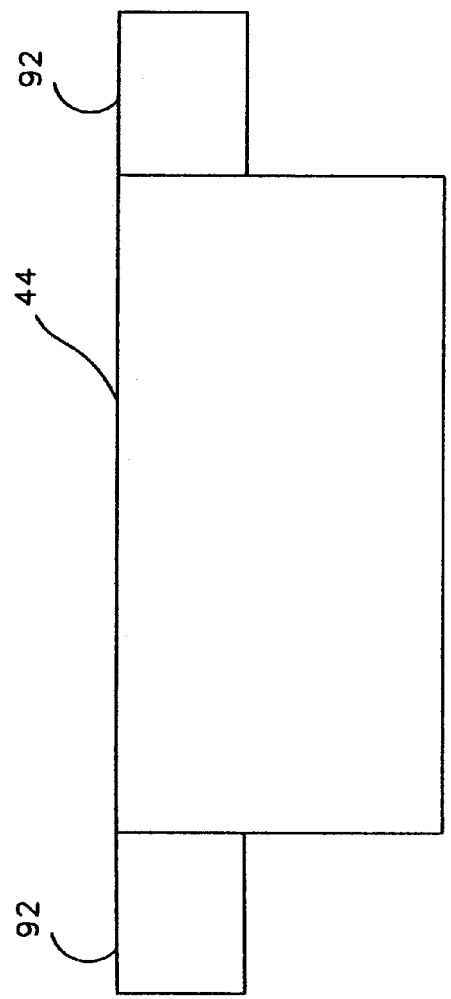

APPARATUS FOR SKINNING PIECES OF POULTRY PRODUCT

TECHNICAL FIELD OF INVENTION

The present invention relates generally to meat skinning devices and particularly to a device for removing the skin from sectioned pieces of poultry, such as for example, bone-in thigh and split breasts.

BACKGROUND OF RELATED ART

Over the last few decades, the fast food and restaurant business has greatly increased the use of poultry products to meet the demand of its customers. Many new product forms have arisen wherein the outer skin is removed from the underling meat portion before the product is prepared or processed further. This skinning of poultry product had largely been done manually in the industry at significant labor intensive cost, the potential for accidental injury, and at a certain level of inconsistency of performance naturally attendent with any manual chore of this type.

The prior art includes various forms of skinning machines designed to remove the skin from fish product or animal meat. One example of a membrane removal apparatus for meat products is found in U.S. Pat. No. 4,292,710. This machine includes a knife edge and gripper roll provided with elongate rows of parallel serrations to strip membrane from steaks and the like and mentions using a similar apparatus for pork bellies. Similar machines are used to skin pieces of poultry product wherein the knife edge cuts or slices the product to remove the skin from the product prior to gripping the loosened skin. However, this type of apparatus tends to cut into the underlying meat and results in a loss of yield of the underlying meat.

Therefore, these prior art machines are not well-suited for skinning poultry product because the nature of the skin and the texture of the meat is not satisfactorily adapted for the same treatment or handling as fish and/or animal meat products. Therefore the poultry industry has continued to experience problems associated with automatic skinning of poultry products, such as lower yields, which have not heretofore been solved by those of ordinary skill in the art.

BRIEF SUMMARY OF THE DISCLOSURE

The present invention relates to an automated poultry skinning apparatus which effectively and efficiently removes the skin from pieces of poultry product in a manner which does not significantly damage or waste the underlying meat portions.

The apparatus of the present invention includes a supporting frame, a feed inlet and discharge outlet, and a skinning station mounted to the frame between the inlet and outlet. The skinning station comprises an endless belt type conveyor which is mounted to the frame in a vertical movable relationship to both advance the product past the skinning station and apply a controlled hold down pressure on the product against a gripper roll and pinch block arrangement mounted below the conveyor. This combination cooperates to assure that the outer skin is effectively gripped or entrapped while the underlying meat is essentially uneffected to peel all the skin from the meat portion rather than attempting to cut or slice the skin from the underlying meat.

The gripper roll is provided with a plurality of raised surfaces or fins which may be in the form of longitudinally extending ridges or raised projections. The raised portions are preferably configured to avoid ripping or tearing of the poultry skin as this will tend to disrupt the desired "peeling" effect wherein all of the skin portion is pulled from the underlying meat section essentially in one piece.

Therefore it is an aspect of the present invention to provide a poultry skinning apparatus which efficiently and effectively pulls the outer skin from the underlying meat portion of the poultry product in a single piece.

It is another aspect of the present invention to provide a method of skinning a poultry product wherein the skin of a piece of poultry product is engaged and trapped under controlled degree of pressure or force to cause the skin to be peeled from the whole piece of poultry product without significant damage to the underlying meat.

It is another aspect of the present invention to provide an apparatus of the type described having the advancing conveyor pivotally mounted on the frame such that the forward end facing the product feed inlet automatically adjusts to receiving product within a range of different sizes while maintaining a downward force within a selected range on the piece of poultry product against the gripper roll.

BRIEF DESCRIPTION OF DRAWINGS

FIG. 8 is a top plan view of one of the two side members forming the chain belt support shown in FIG. 5;

FIG. 9 is an end elevational view of the side member shown in FIG. 8;

FIG. 10 is a side elevational view of the inside wall of the side member shown in FIG. 8;

FIG. 11 is a side elevational view of the gripper member and its driving shaft shown in isolation from the remaining components of the apparatus shown in FIGS. 1–4, which form a part of the present invention;

FIG. 12 is an end elevational view of the gripper and shaft shown in FIG. 11;

FIG. 13 is a side elevational view of the pinch block, shown isolated from the remaining components, which forms a part of the present invention;

FIG. 14 is an end elevational view of the pinch block shown in FIG. 13;

FIG. 15 is a top plan view of the pinch block shown in FIG. 13;

Figure 1:
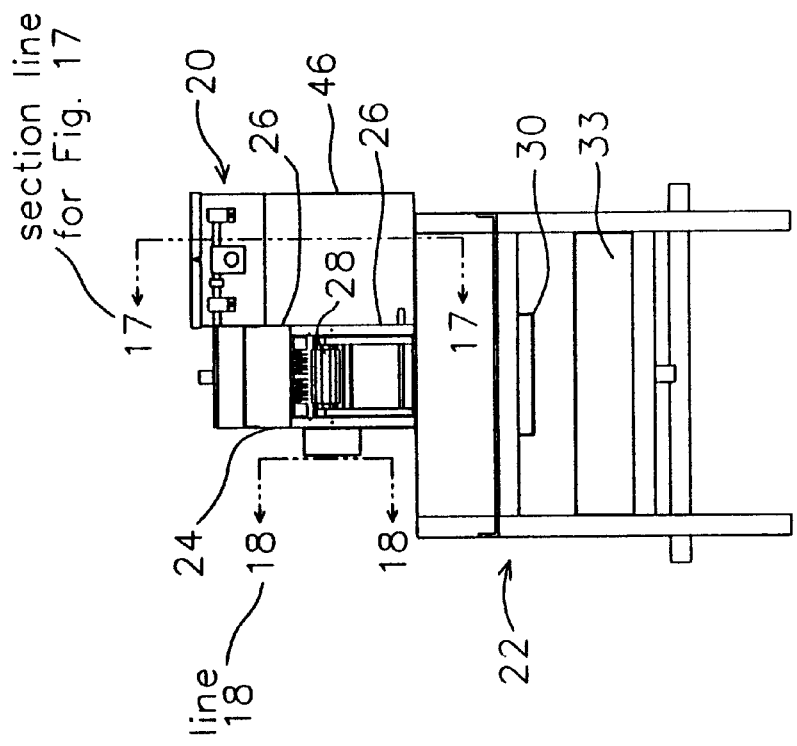
FIG. 1 is a front elevational view of an apparatus for skinning poultry product sections constructed in accordance with the present invention.
Figure 2:
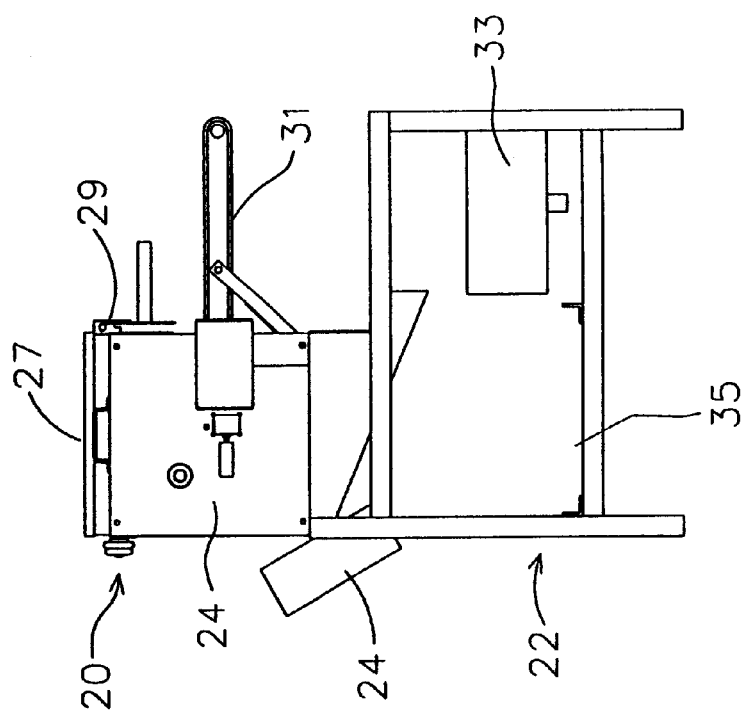
FIG. 2 is a side elevational view of the apparatus shown in FIG. 1.
Figure 3:
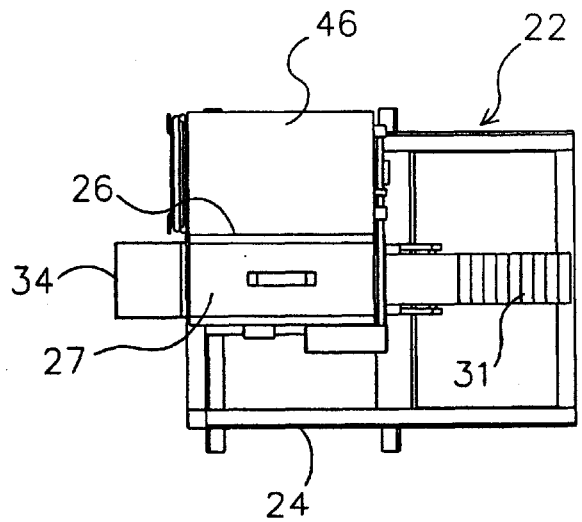
FIG. 3 is a top plan view of the apparatus shown in FIG. 1.
Figure 18:
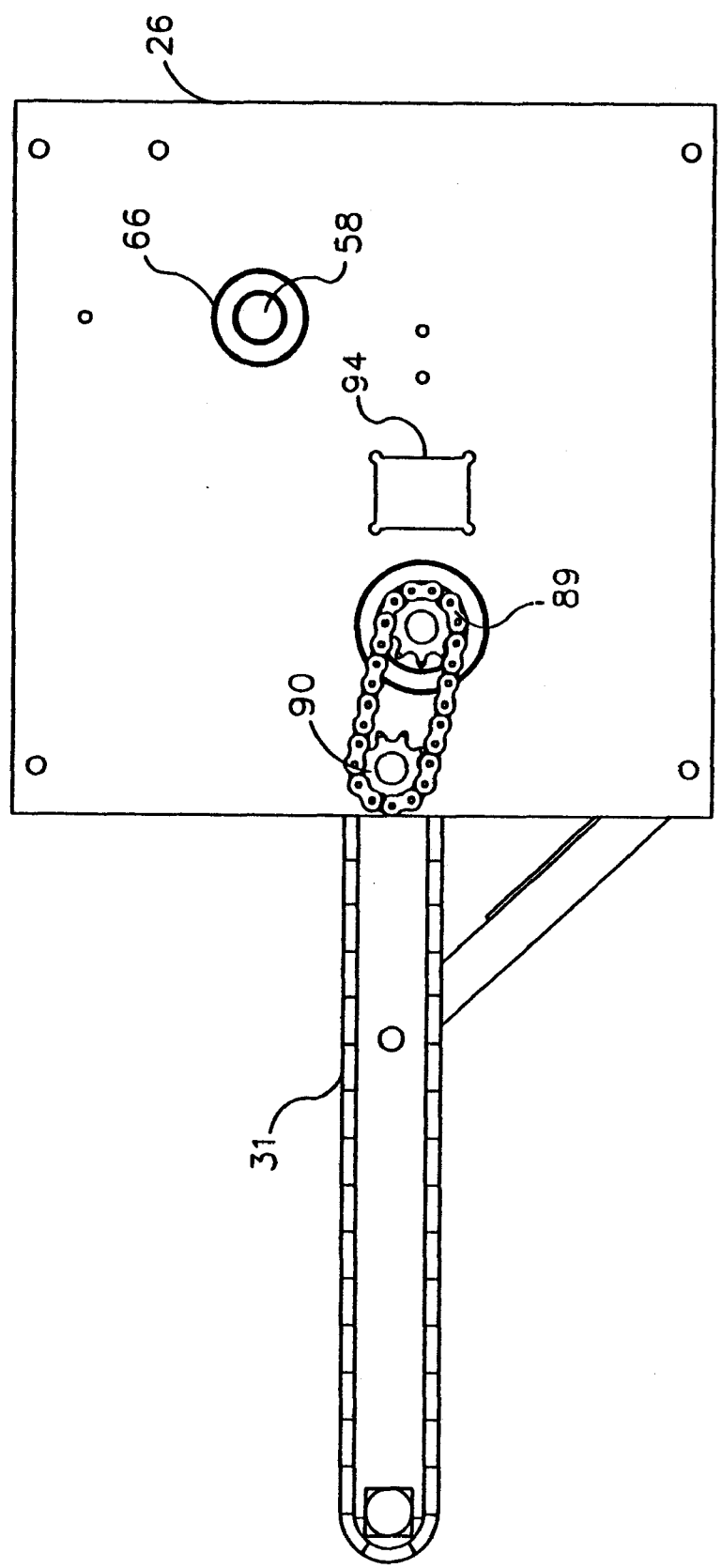
Figure 19:
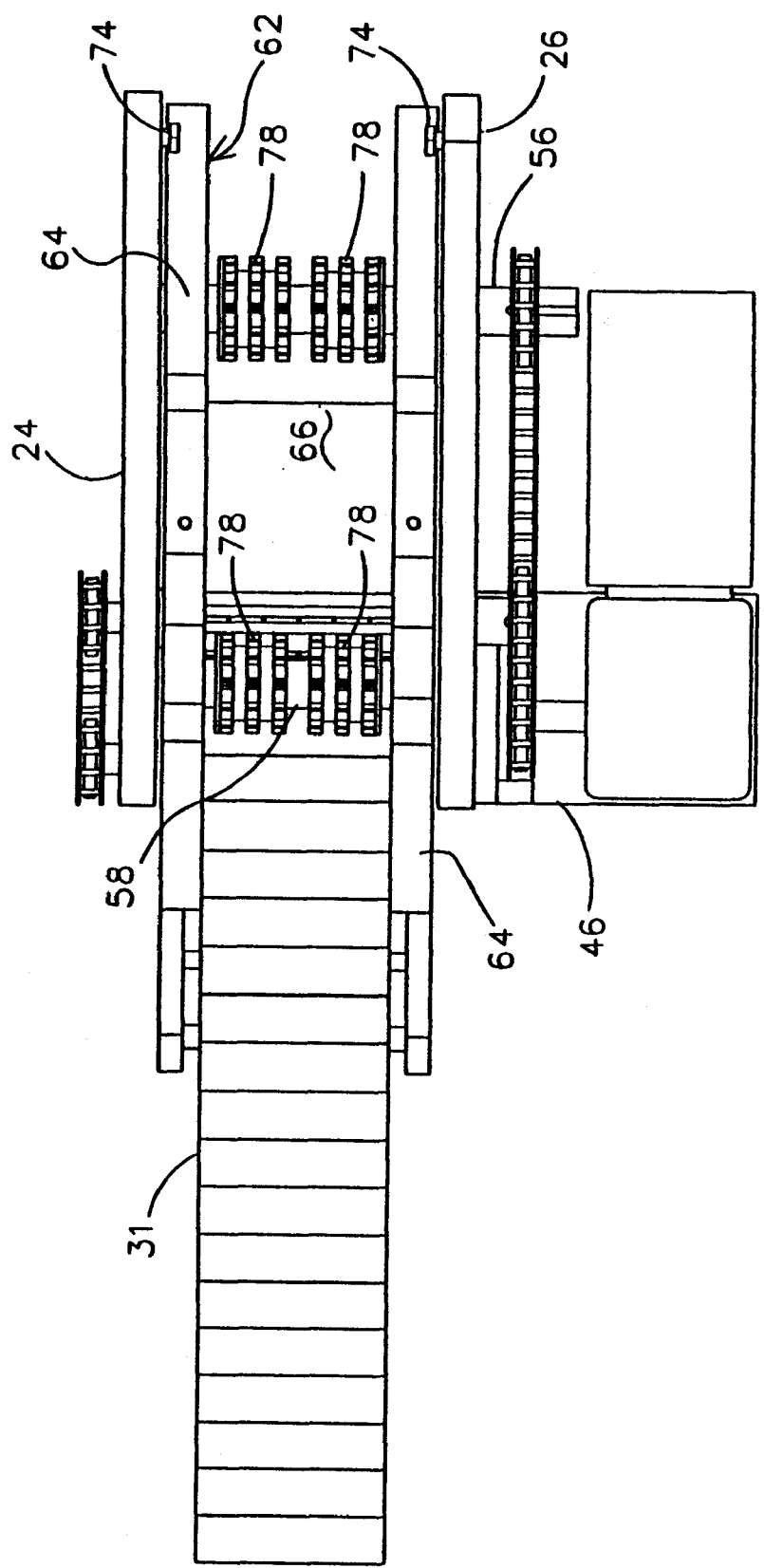
Figure 20:
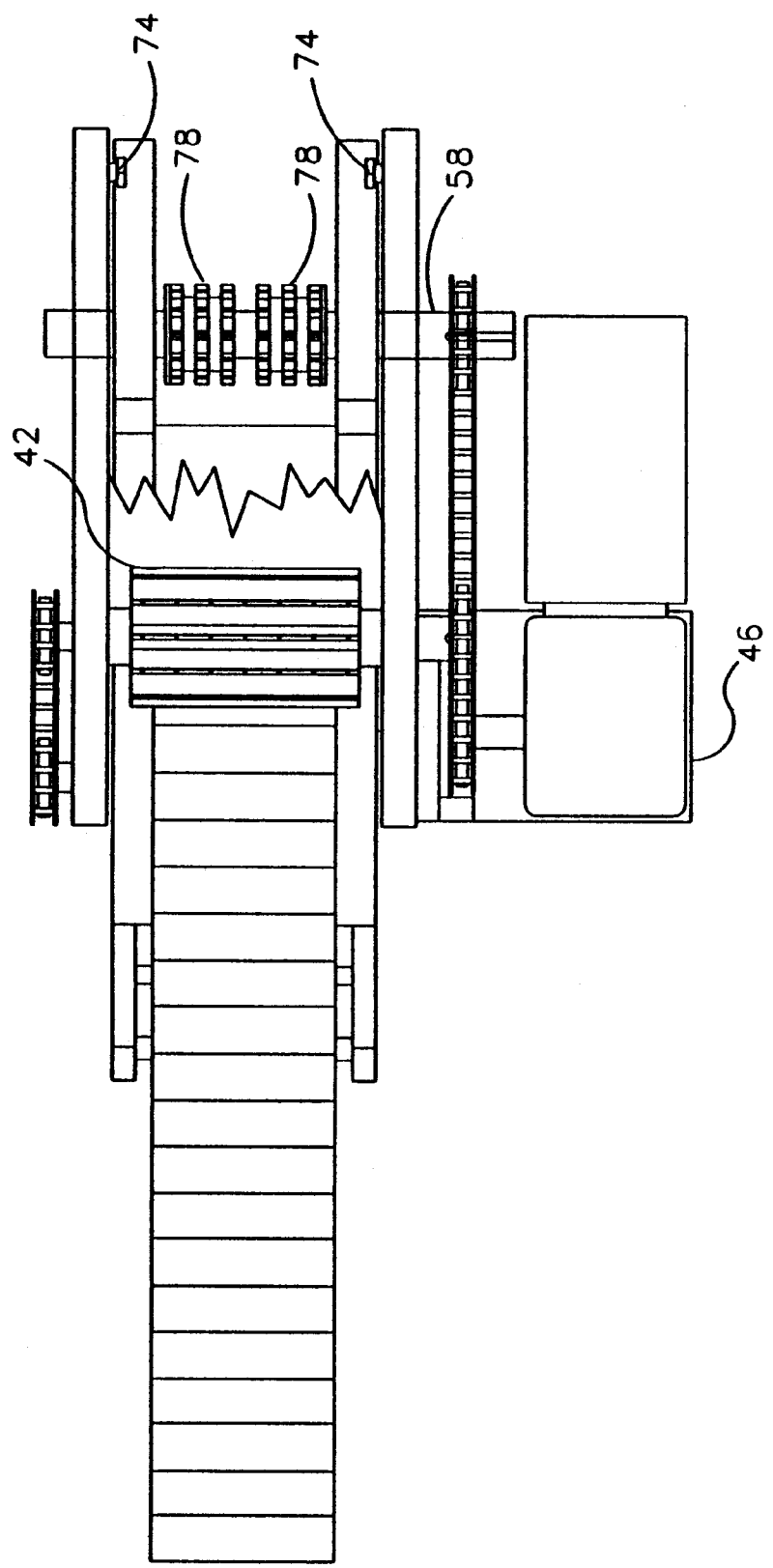

FIG. 18 is a partial side sectional view taken along line 18—18 in FIG. 1 illustrating the sprocket and chain arrangement for driving the feed conveyor;

FIG. 19 is a top plan view similar to the view shown in FIG. 3 with the top wall removed from the support frame to illustrate the underlying structure; and FIG. 20 is a top plan view of the portion of the apparatus shown in FIG. 19 with a portion of the chain belt removed to show the gripper component forming a part of the present invention.

Figure 21:
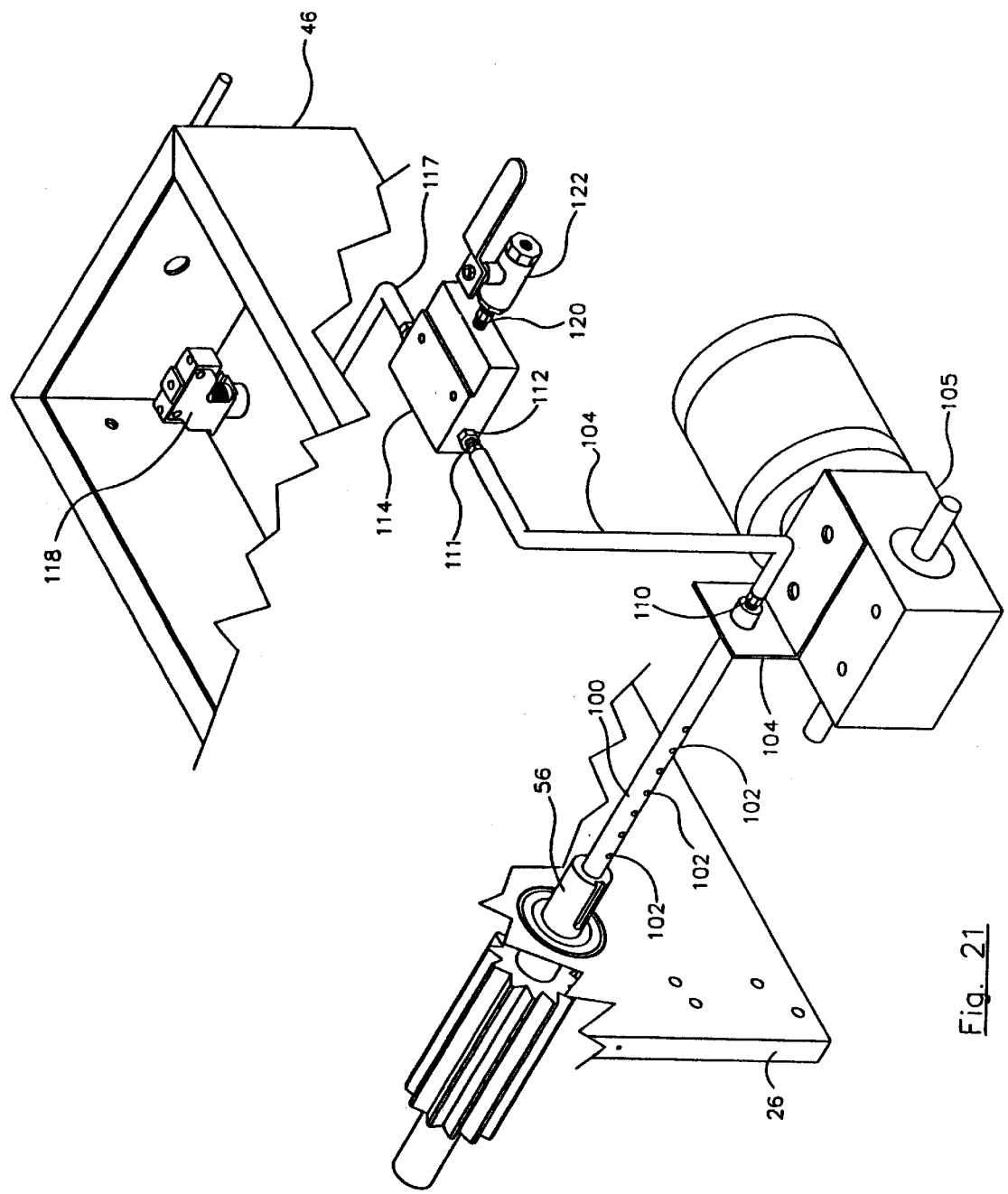

FIG. 21 is a perspective view of an arrangement for introducing water to the poultry skinning apparatus.

DETAILED DESCRIPTION OF THE INVENTION

With reference to FIGS. 1–4, an apparatus constructed in accordance with the present invention for skinning pieces of poultry product is illustrated and includes a supporting frame, indicated generally at 20, which optionally can be mounted on a base or table, indicated generally at 22, for conveniently locating the apparatus and the auxiliary product and skin collection means in the most practical arrangement for a given plant production layout.

Support frame 20 comprises side walls 24 and 26 and, optionally, a top wall 27. Side walls 24 and 26 are mounted to base 22 in any conventional manner well-known to those of ordinary skill in the art. The bottom of frame 20 is open to communicate with a chute 30 for receiving the skin portion removed from the poultry product sections and directing them to a collection area, such as bin 31.

A rear discharge opening in frame 20 includes a ramp-like structure 32 which directs the skinned product to a separate collection area relative to the removed skin portions via a chute 34. The separate collection area for the skinned product may be a conventional bin or a conveyor, not shown, as dictated by the choice of the individual user of the apparatus and may be located in the area designated 35.

Frame 20 includes a frontal opening between walls 24 and 26 which forms a product feed inlet 28. As seen in FIGS. 1–4, a conventional endless belt conveyor 31 may be employed to load product and carry it to the feed inlet 28 where it is delivered to a skinning station, indicated generally at 38. However, other forms of conveying the product to the feed inlet 28 may be employed to deliver the product to the skinning station 38 without departing from the present invention.

A partial front wall portion 29 is desirably included which defines the upper extent of feed inlet 28, and in cooperation with top wall 27, partially encloses the skinning station to reduce contact with airborne contaminants.

Figure 4:
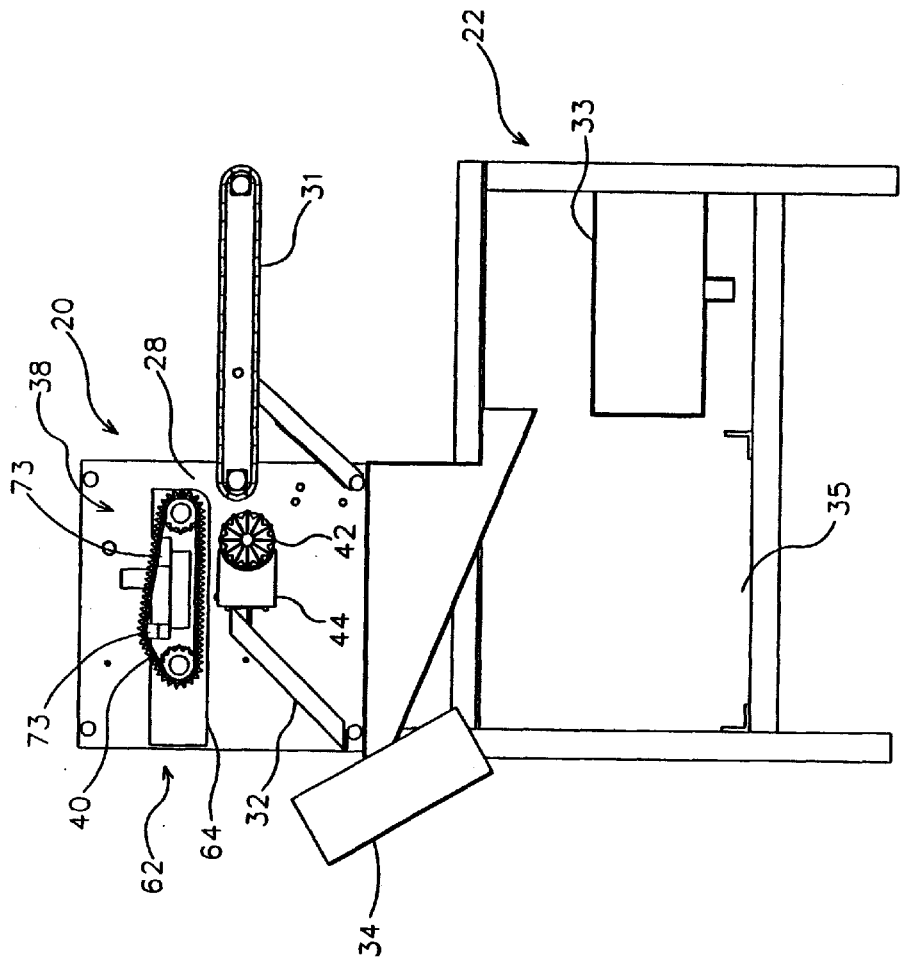
FIG. 4 is a side sectional view of the apparatus shown in FIG. 1, the section being taken along the centerline extending from the front to the rear of the apparatus.
Figure 6:
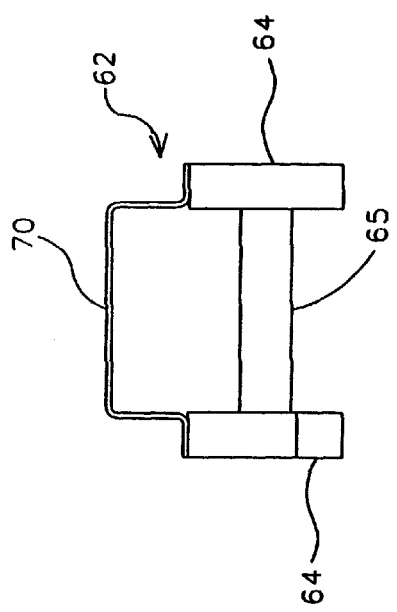
FIG. 6 is an end elevational view of the chain belt support shown in FIG. 5.
Figure 5:
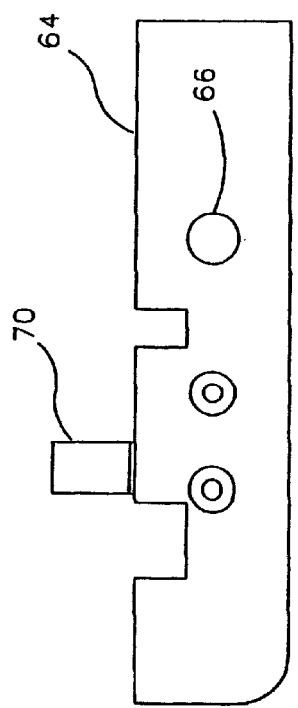
FIG. 5 is a side elevational view of the chain belt support shown in isolation from the remaining components of the apparatus shown in the preceding Figs.
Figure 7:
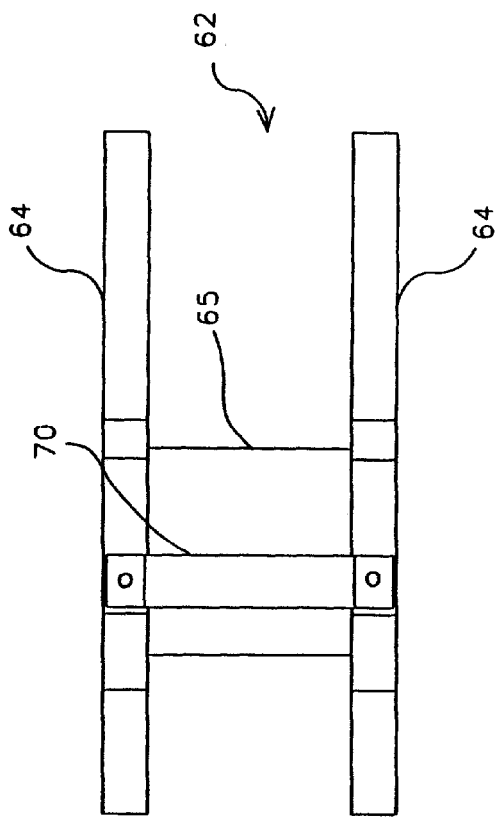
FIG. 7 is a top plan view of the chain belt support shown in FIG. 5.

The skinning station 38 includes an endless chain belt 40 mounted on a chain support block 62 which in turn is mounted to side wall 26 in a vertically movable relationship which allows the space defined between the lower run of chain 40 and a gripper 42 and pinch block 44 arrangement to automatically adjust to and receive a selected range of different sizes of poultry sections to be skinned and yet maintain a substantially constant downward pressure or force on the poultry piece during the skin removal operation. Endless belt chain 40 functions to transport the piece of poultry product entering feed inlet 28 over gripper 42. Gripper 42 is rotatably mounted to frame 20 and driven by a conventional motor to rotate in the same counterclockwise direction as the movement of chain 40, as seen in FIG. 4, and cooperatively aids in moving the poultry product toward the discharge outlet as well as function in cooperation with pinch block 44 to engage and pull the outer skin off the product as described in detail later herein.

Now referring to FIGS. 1–4, 17, 18 and 21, an enclosure 46 mounted adjacent to side wall 26 and on base 22 houses a conventional electric motor 105 and a conventional series of sprockets and a drive chain to drive the rotating parts of the apparatus.

Figure 17:
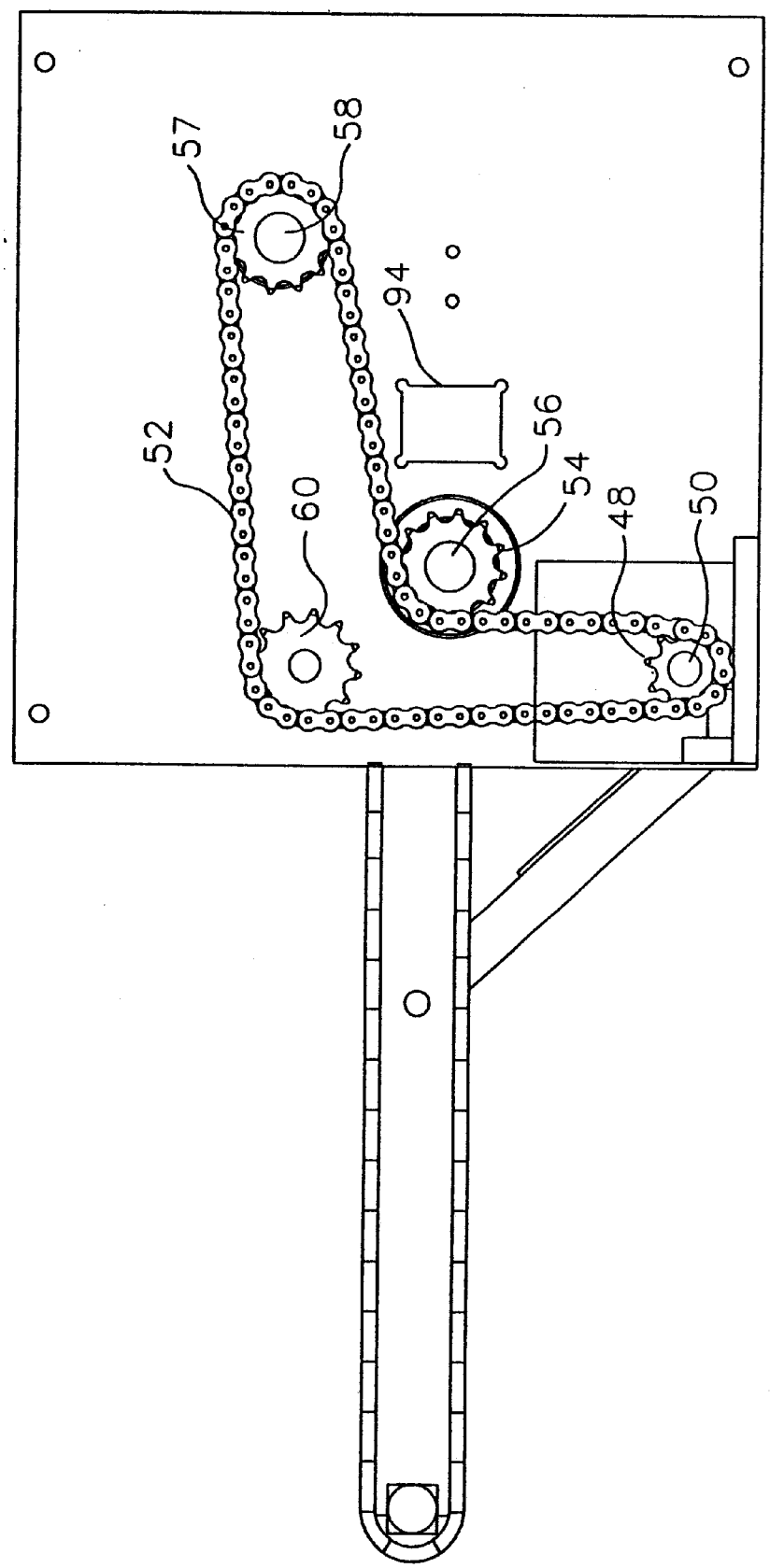
FIG. 17 is a side sectional view of a part of the apparatus shown in FIG. 1, the section being taken along line 17—17 to illustrate the sprocket and chain arrangement for driving the rotating parts of the present invention.

As shown in FIG. 17, a driving sprocket 48 is operatively mounted to motor shaft 50. A driving chain 52 is operatively mounted about sprocket 48 and sprocket 54 which is attached to the driven end of the rotatably mounted gripper shaft 56, the driven sprocket 57 attached to shaft 58 of the chain belt 40, and around a tension shaft and sprocket arrangement 60.

Now referring to FIGS. 5–10, a support member 62 for chain belt 40 is shown and includes a pair of generally rectangular blocks 64 preferably made from a plastic material such as Delron. Blocks 64 may be fixed to one another to form a unitary support structure by a center plate 65 which is bolted to the side blocks 64 by a conventional threaded fasteners, such as 67. Other conventional forms for attaching blocks 64 together may also be used without departing from the spirit of the present invention or a single piece may be substituted to form the support. However, using separate members as shown saves material and is preferred. A handle 70 may be optionally provided and attached across both blocks 64 by a conventional fastener to permit lifting of support member 62 for cleaning or inspection.

Referring specifically to FIGS. 8–10, each block 64 includes a pair of bores 66 and 68 and conventional bearings for drive shaft 58 and idler shaft 59 which carry chain belt 40. Idler shaft 59 is supported solely in member 62. Blocks 64 are pivotally mounted about shaft 58 such that the whole support structure 62 and chain belt 40 may be pivoted about shaft 58 which permits the forward end thereof to swing about a generally horizontal axis.

The upper surface of each block 64 is provided with a pair of recesses 72 to accommodate conventional chain belt tensioner blocks, such as 73, to adjust the tension of chain belt 40 in a conventional manner.

Therefore member 62 is supported between side walls 24 and 26 by drive shaft 58 and pivotally mounted thereto such that the forward end of member 62 is free to pivot in a generally vertical direction about a horizontal axis. As seen in FIG. 20, a stop 74 in the form of a bolt or pin is mounted on the inner side of each of side walls 24 and 26 above the rearward end portion of member 62 to function as a limit to the extent of downward pivoting of the forward end of support 62 and defines a selected separation or space between chain belt 40 and gripper 42 without any product disposed between them. If desired, a similar stop may be employed which would engage the forward end of support 62 to limit the degree of upward pivoting of the forward end.

However, upon a piece of poultry product entering feed inlet 28 and being carried over the gripper 42, product larger than the defined space will cause the forward end of support member 62 to move upward about the pivot point of driving shaft 58 and carry with it the forward end of chain belt 40 which is operatively mounted thereon as described herein. If desired, another stop could be employed in a similar fashion to limit the upward movement of the forward end of member 62 to a selected level along the inner wall of blocks 64.

An important feature of the present invention is providing the relative vertical movement between at least the forward portion of chain belt 40 aligned with the gripper 42 to permit a range of different sizes of poultry product to pass through the skinning station with a controlled range of downward pressure or force being applied to the piece of poultry for a given size range of the product. In the preferred embodiment shown, the downward force applied to the piece of poultry engaging the gripper is set by the weight of the support member 62 and chain belt 40 arrangement. This weight can be adjusted by controlling the initial weight of the arrangement or by merely adding weights to the forward end in any conventional manner in the event more weight is deemed appropriate to accomplish the level of force applied to the piece of poultry product during the skinning step.

However, it is important to point out that too much applied force on the poultry product is undesirable and is likely to cause excessive ripping or tearing of the outer skin and/or gouging of the underlying meat portions upon engagement between the gripper 42 and the chain belt 40 or the gripper 42 and the pinch block 44 as described in detail later herein.

While other forms of mounting the chain belt to apply a controlled amount of downward force and adjust automatically to different sizes of product may be employed without departing from the spirit of the present invention, the free pivoting action of the preferred embodiment is simple, inexpensive, and has been shown to work very well. However, those of ordinary skill, in view of the disclosure herein, could employ alternative means such as a piston and cylinder arrangement to movably adjust the distance between chain belt 40 and gripper 42, for example, in response to the size of the poultry piece to accomplish a similar function.

In test runs, poultry thigh pieces and much larger piece, such as split breasts, have been easily handled one after another with excellent results. It should be noted that even the same cut of poultry, such as thighs or breasts, are often not of the same size. Therefore the automatic adjustment to size in production volumes of the same cuts of poultry, while maintaining a controlled downward pressure or force upon the product, is important to assure the whole skin is removed efficiently with little or no damage to or loss of the underlying meat portions. The latter resulting in lowering the yield of the desired end product.

Now referring to FIGS. 4 and 20, shafts 58 and 59 are provided with a plurality of sprockets, such as 78, which carry a plurality of spaced, conventional endless conveyor chain 80 provided with raised points 82 to form chain belt 40 to engage a piece of poultry entering feed inlet 28 and progressively carry it past gripper 42 and out the discharge opening communicating with ramp 32. Such a chain belt may be comprised of conventional steel chain or other suitable material, such as Delron, which are appropriate for food handling operations.

Now referring to FIGS. 4, 11–12 and 16, gripper 42 comprises a generally cylindrical member provided with a plurality of raised projections or fins 86. Preferably, fins 86 are formed by creating V-shaped recesses in a cylindrical body to leave an essentially flat surface 88 at the outer end of each fin 86. A central bore is provided in gripper body 44 to fixedly receive drive shaft 56 which is conventionally rotatably mounted in opposing side walls 24 and 26 below a forward portion of chain belt 40. Delron is a desirable material to use to construct gripper 42 and has worked well.

As shown in FIG. 18, the opposite end of shaft 56 may be provided with a sprocket and chain assembly 89 operatively connected to a sprocket and shaft arrangement 90 to drive feed conveyor 31 such that only one motor is needed to drive all rotating parts of the apparatus.

Now referring to FIGS. 13–16, pinch block 44 is mounted to frame 20 between side walls 24 and 26 and includes an arcuate surface 45 disposed in adjacent, close tolerance relationship to the arcuate path defined by the rotation of the outer surfaces 88 of fins 86 of gripper 42. Pinch block 44 includes narrowed, generally rectangular end portions 92 which are received by similarly shaped openings 94 provided in side walls 24 and 26 to support the pinch block 44 in a fixed position.

Figure 16:
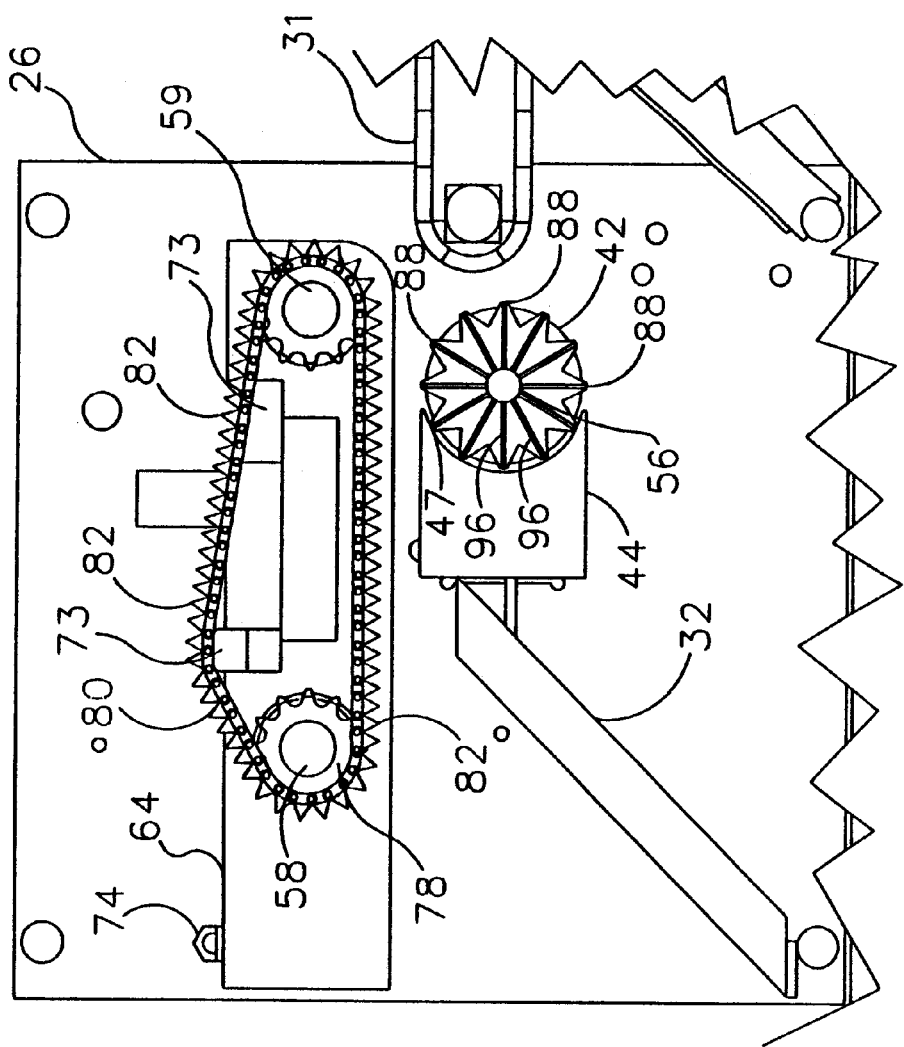
FIG. 16 is a partial view of the sectional view shown in FIG. 4 illustrating the main components forming the skinning station of the present invention.

As seen in FIG. 16, the upper end of arcuate surface 45 closely mates with the end of each fin 88 as it approaches the pinch block 44. A piece of poultry product engaged by chain belt 40 and the outer ends 88 of fins 86 is carried toward the opening between the upper end of arcuate surface 45 and the approaching end 88 of fins 86. The outer end 88 of a fin 86 engaging the product and approaching this opening cooperates with a lip 47 defining the upper end of surface 45 to pinch or trap the outer skin between the outer end 88 and the arcuate surface 45. As the piece of poultry is carried toward the discharge opening by the combined action of the chain belt 40 and the similar counterclockwise rotation of gripper 42, each outer end 88 continues to pull the point of engagement with the skin downwardly against the surface 45. In the more preferred embodiment shown, each successive fin 88 engages a spaced point of contact with the outer skin of the piece of poultry in a similar manner relative to a forwardly moving adjacent fin such that the skin is continuously pulled from the poultry product in one piece without cutting, tearing or ripping of the skin. If the skin is torn or ripped in any significant fashion by the engagement of the fins 88 with the chain belt 40 or the initial engagement with pinch block 44, strips or large areas of skin are likely to remain adhered to the underlying meat and require undesirable subsequent manual removal.

The outer ends 88, which engage and trap the skin against arcuate surface 45, continue to pull a respective portion of skin downwardly along arcuate surface 45 as the poultry piece is engaged by gripper 42 and belt 40. The skinned product is moved toward the discharge end and into chute 34. By controlling the downward pressure applied to the piece of poultry against the gripper 42 and the opening to the arcuate surface 45 of the pinch block 44, gripping of the outer skin is accomplished with very little or no damage to the underlying meat portions. This results in a very high percentage of the poultry pieces processed having the whole skin removed in substantially one piece, increased production rates and less loss of end meat product compared to prior art methods and means which employ a knife blade and cutting action to separate the outer skin from the underlying meat.

It is highly preferred that the outer end 88 of fins 86 have ends configured so as to reduce the tendency to pierce the outer skin which may lead to a greater tendency to rip or tear the skin and less efficient removal of the skin from the poultry product.

Tests of apparatus constructed in accordance with the present invention have accomplished total removal of all skin from as high as 85 to 90 percent of the pieces of poultry product passing through the skinning station with no significant loss of the underlying meat portion as compared to prior art apparatus. Even a relatively small percent increase in the yield of meat product produced in high volume operations leads to very significant increases in dollar volumes of product produced.

Optionally, gripper 42 may be provided with a plurality of radially drilled holes 96 extending in spaced longitudinal relationship along the outer surfaces 88 of each fin 86. Drive shaft 56 may be provided with a central bore 98 operatively connected to a source of pressurized water or air, not shown, which outlets through holes, such as 96, which communicate with bore 98. This flow of water streams conveniently provides a positive removal of the skins from the gripper 42 prior to its return rotation to engage a new piece of poultry product. The removed skin falls from the lower end of gripper 42 after the fins engaging the skin disengage from arcuate surface 45 and are then deposited in chute 30 which is communicated to a collection bin 31.

A preferred arrangement for introducing the water is shown in FIG. 21. A water pipe 100 is inserted in a close fit relationship inside bore 98 provided in shaft 56 and is provided with a series of spaced outlet holes 102. Shaft 56, however, is still free to rotate about pipe. 100. The outer end of pipe 100 may be conventionally mounted to an L-flange 104 which may be conveniently mounted on the housing of electric motor 105. A flexible hose 106 is attached at one end via a conventional adapter 110 to the outer end of pipe 100 and by a similar adapter 111 to port 112 in a water inlet block or manifold 114. Inlet block 114 may be mounted under the bottom wall of housing 46 in any conventional manner. Another flexible hose 117 similarly conventionally connects a port 116 in block 114 to a pressure switch 118 mounted within housing 46. An inlet port 120 provided in inlet block 114 is operatively connected to a conventional ball valve 122 which includes a conventional adapter for connecting an inlet hose, not shown, to a source of pressurized water, which can be conventional tap water. It should be readily appreciated that other similar conventional arrangements can be used without departing from the spirit of the present invention.

In view of the foregoing description herein, it should be readily understood that the present invention provides an improved apparatus and method for removing the skin from poultry product pieces which improves yield and is of relatively simple construction and efficient in operation.

What is claimed is:

1. An automated poultry product skinning apparatus comprising, in combination,
   a) a support frame provided with a frontal opening defining a product feed inlet and a rear opening defining a product discharge outlet;
   b) a conveyor mounted to said support frame and aligned to engage the upper surface of a piece of poultry product delivered to said feed inlet and direct said product in a path toward said discharge outlet, said conveyor being mounted to said frame for selected vertical movement of at least a forward end of said conveyor in response to the size of the piece of poultry product delivered to said feed inlet;
   c) a gripper member rotatably mounted to said frame and having a plurality of radially extending fins having outer ends and disposed in vertically spaced relationship below said conveyor for engaging a lower side of said piece of poultry product passing between said gripper roll and said conveyor;
   d) a pinch block mounted on said frame and including an arcuate surface fixedly positioned in close clearance relationship to the arcuate path of the outer end of said fins during a portion of their rotation to define an opening configured to engage the outer skin attached to a piece of said poultry product between the outer ends of said fins and the arcuate surface of said pinch block;
   e) said close clearance relationship and said opening being configured to firmly entrap said attached outer skin between the outer end of each of said fins and said arcuate surface of said pinch block to pull the outer skin from its attachment to the underlying meat portions of said piece of poultry product without piercing or cutting of the outer skin upon continued rotation of said fins and engagement of said piece of poultry product with said conveyor.

2. An automated skin removal apparatus for removing the outer skin from a piece of poultry product, comprising in combination;
   a) a support frame defining a product feed inlet and a product discharge outlet;
   b) a conveyor mounted to said frame and aligned with said feed inlet to engage an upper surface of a piece of poultry product advanced through said feed inlet and direct said piece of poultry product toward said discharge outlet, said conveyor having a distal end relative to said feed inlet freely pivotally mounted relative to said frame permitting an opposing forward end of said conveyor to move in a substantially vertical direction responsive to the size of a piece of poultry product entering said feed inlet and engaging said opposing forward end of said conveyor;
   c) a gripper member rotatably mounted to said frame in vertical spaced relationship below said conveyor and including at least one radially extending fin having an outer end for engaging a lower surface of a piece of poultry passing between said outer end of said fin and said conveyor;
   d) an arcuate pinch surface mounted to said frame below said product conveyor in closely adjacent relationship to a portion of the arcuate path of travel of the outer end of said fin and defining an opening between said arcuate pinch surface and the path of travel of said outer end of said fin, said opening configured to engage and entrap without piercing or cutting, a portion of skin attached to said piece of poultry product between said pinch surface and said outer end of said fin to pull the attached skin from an underlying meat portion of said piece of poultry product as said poultry product is moved toward said discharge outlet.

3. An automated poultry product skinning apparatus comprising, in combination,
   a) a support frame provided with a frontal opening defining a product feed inlet and a rear opening defining a product discharge outlet;
   b) a conveyor mounted to said support frame and aligned to engage the upper surface of a piece of poultry product delivered to said feed inlet and direct said product in a path toward said discharge outlet;
   c) a gripper member rotatably mounted to said frame and having a plurality of radially extending fins having outer ends disposed in vertically spaced relationship below said conveyor for engaging a lower side of said piece of poultry product passing between said gripper roll and said conveyor;
   d) a pinch block mounted on said frame and including an arcuate surface fixedly positioned in close clearance relationship to the arcuate path of the outer end of said fins during a portion of their rotation to define an opening between the outer end of said rotating fins and the arcuate surface of said pinch block;
   e) said close clearance relationship and said opening being configured to firmly entrap said attached outer skin between the outer end of said fins and said arcuate surface of said pinch block to pull the outer skin from its attachment to the underlying meat portions of said piece of poultry product without piercing or cutting the outer skin upon continued rotation of said fins and engagement of said piece of poultry product with said conveyor.

4. A method of removing the outer skin from a piece of poultry product, comprising in combination;

a) introducing a piece of poultry product to a feed inlet defined between a moving conveyor spaced above a rotating gripper member provided with at least one radially extending fin;

b) engaging an upper surface of said poultry product with said moving conveyor and a lower surface of said poultry product with an outer end of said radially extending fin to propel said poultry product along a selected path of travel from said feed inlet toward a discharge outlet;

c) gripping at least a portion of the outer skin attached to said poultry product between a fixed arcuate surface positioned in closely spaced mating relationship with a portion of the arcuate path of travel of said outer end of said fin to firmly entrap and pull the attached outer skin of said piece poultry product away from its attachment to the underling meat portions without piercing or cutting the outer skin as said piece of poultry product moves along said selected path past said fin and toward said discharge outlet, and directing said removed skin to a collection area spaced from said discharge outlet.

5. The method defined in claim 4 further comprising, causing a forward end of said conveyor to freely pivot in a direction toward or away from said gripping member actuated by engagement of a piece of poultry product with said forward end to accommodate different sizes of pieces of poultry product while maintaining a generally constant downward force upon a piece of poultry product disposed between said conveyor and said gripping member, said generally constant downward force exerted solely by the weight of said forward end of said conveyor.

* * * * *